United States Patent [19]

Holahan et al.

[11] 4,328,937

[45] May 11, 1982

[54] FISHING SPINNING REELS WITH AUXILIARY DRAG MECHANISMS

[75] Inventors: Joseph M. Holahan, Anderson, S.C.; Takehiro Kobayashi; Konin Sazaki, both of Fukuyama, Japan

[73] Assignee: Ryobi Limited, Hiroshima, Japan

[21] Appl. No.: 131,673

[22] Filed: Mar. 19, 1980

[30] Foreign Application Priority Data

Jul. 5, 1979 [JP] Japan .................. 54-93299[U]
Jul. 6, 1979 [JP] Japan .................. 54-93698[U]
Jul. 6, 1979 [JP] Japan .................. 54-93699[U]
Jul. 9, 1979 [JP] Japan .................. 54-94883[U]

[51] Int. Cl.³ .................................... A01K 89/02
[52] U.S. Cl. .................................... 242/218; 192/97; 464/47
[58] Field of Search ............... 242/218, 220, 211, 212, 242/84.21 R, 84.2 A; 192/14, 93 A, 97; 64/30 R, 30 C

[56] References Cited

U.S. PATENT DOCUMENTS

| | | | |
|---|---|---|---|
| 3,223,349 | 12/1965 | Holahan | 242/84.2 A |
| 3,604,658 | 9/1971 | Nurmse | 242/218 |
| 4,162,048 | 7/1979 | Sazaki | 242/84.2 G |

FOREIGN PATENT DOCUMENTS

807238 6/1951 Fed. Rep. of Germany ...... 242/220

Primary Examiner—Billy S. Taylor
Attorney, Agent, or Firm—Birch, Stewart, Kolasch & Birch

[57] ABSTRACT

In a fishing spinning reel of the type wherein a rotor is rotated by a handle through a main drag mechanism and a drag shaft, a boss of the handle is connected through screw threads to a sleeve which supports the main drag mechanism, the drag shaft extends through the sleeve, and a drag knob is connected to one end of the drag shaft, there is provided an auxiliary drag mechanism interposed between the handle bars and the drag knob. The auxiliary drag mechanism comprises an annular ring interposed between the drag knob and the handle boss and a torque spring interposed between the annular ring and the handle boss so that when the handle is rotated in one direction the torque spring is compressed against the drag knob. The sleeve is provided with multiple threads and a polygonal portion adjacent the multiple threads, and the annular ring is provided with a polygonal opening to receive the polygonal portion.

7 Claims, 4 Drawing Figures

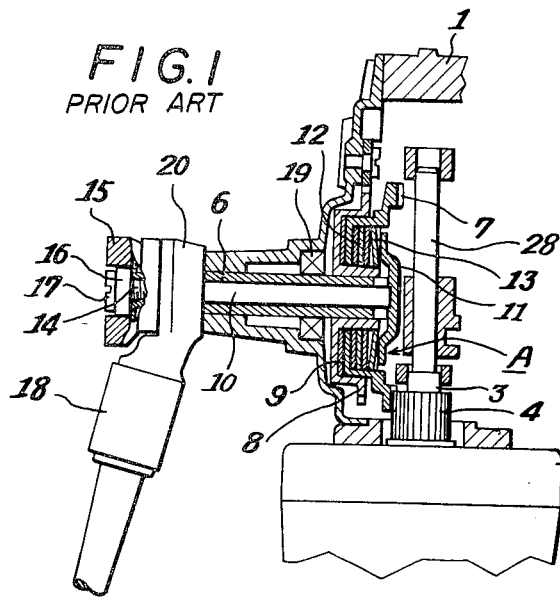
FIG. 1 PRIOR ART
FIG. 2
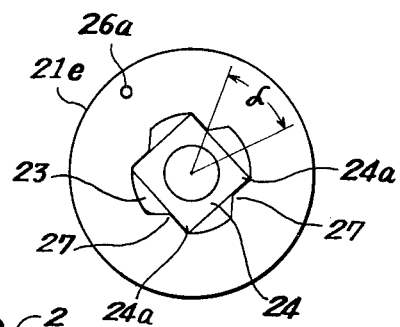
FIG. 3
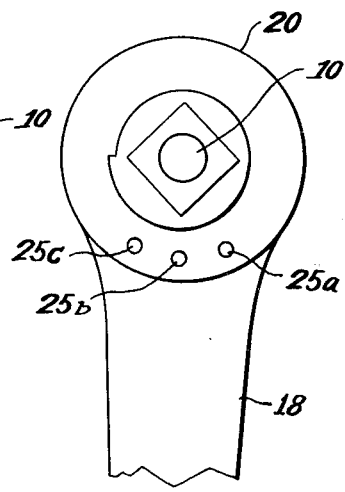
FIG. 4

FISHING SPINNING REELS WITH AUXILIARY DRAG MECHANISMS

BACKGROUND OF THE INVENTION

This invention relates to a fishing spinning reel with an auxiliary drag mechanism.

In a prior art fishing spinning reel, a rotor is allowed to rotate and slip with respect to a spool secured to a main shaft so that when a fishing string is payed out the rotor rotates and slips under a drag force to unwind the string.

As shown in FIG. 1, the prior art drag mechanism A utilized in the reel is constructed such that a pinion 4 of a hollow tube 3 and shaft 28 which rotatably support a rotor 2 by a main body 1 is meshed with a master gear 7 of a sleeve 6. The master gear 7 is received in a recess of a cup shaped ratchet wheel 8 with a washer 9 interposed therebetween and between a disc 11 secured to the inner end of a drag shaft 10 extending through the sleeve 6 and the master gear 7 is interposed a drag mechanism A comprising a plurality of laminated drag washers 12 and spring washers 13. Screw threads 14 are formed on the outer end of the drag shaft 10 extending beyond the sleeve 6 to secure a drag knob 15 through a bushing 16 and a set screw 17. With this construction, in an open drag state and where the drag force is minimized, it is impossible to transmit a torque to the rotor 2 by the operation of a handle 18 secured to the sleeve 6, so that it is impossible to provide an automatic kick for reversing a bail arm when transferring to the take up state from the pay off state of the fishing string. For this reason, it is necessary to reverse the bail arm by a manual operation each time such transfer is made. Moreover, it has been necessary to tighten the drag knob 15 to provide an automatic kick, so that to establish the open drag state, it is necessary to loosen the drag knob which is troublesome.

We have already proposed to interpose an auxiliary drag mechanism between the drag knob and the handle so as to transmit a torque to the master gear 7, that is, the rotor irrespective of the strength of the drag force.

SUMMARY OF THE INVENTION

It is an object of this invention to improve the auxiliary drag mechanism for increasing the drag force at the time of the automatic kick with a small angle of rotation of the handle.

Another object of this invention is to provide an improved auxiliary drag mechanism capable of automatically releasing the pressure exerted by the drag knob after establishing the automatic kick state under a state in which the open drag and the drag force are minimized.

Still another object of this invention is to provide an auxiliary drag mechanism capable of making maximum the pressure of the drag knob that is the torque by a relatively small angle of rotation of the handle.

A further object of this invention is to provide an improved auxiliary drag mechanism capable of automatically returning the handle to the original position after effecting an automatic kick under a state in which the open drag and the drag force have been made minimum and capable of adjusting the returning force.

These and other objects can be accomplished by providing a fishing spinning reel of the type wherein a rotor is rotated by a handle through a main drag mechanism and a drag shaft, a boss of the handle is connected through screw threads to a sleeve which supports the main drag mechanism, the drag shaft extends through the sleeve, a drag knob is connected to one end of the drag shaft, and there is provided an auxiliary drag mechanism interposed between the drag shaft and the handle boss, the auxiliary drag mechanism comprising an annular ring interposed between the drag knob and the handle boss and a torque spring interposed between the annular ring and the handle boss so that when the handle is rotated about the sleeve the torque spring is compressed to urge the annular ring against the drag knob. The sleeve is provided with multiple thread screw and a polygonal portion adjacent thereto, and the annular ring is provided with a polygonal opening for receiving the polygonal portion. The expression "multiple thread" when used means a screw thread composed of two or more distinct parallel intertwined threads or helices.

BRIEF DESCRIPTION OF THE DRAWINGS

In the accompanying drawings:

FIG. 1 is a side view, partially in longitudinal section, of a fishing spinning reel utilizing a prior art auxiliary drag mechanism;

FIG. 2 is an enlarged longitudinal sectional view showing one example of the auxiliary drag mechanism according to this invention;

FIG. 3 is a sectional view taken along a line III—III shown in FIG. 2; and

FIG. 4 is a sectional view taken along a line IV—IV shown in FIG. 2.

DESCRIPTION OF THE PREFERRED EMBODIMENT

An auxiliary drag mechanism B embodying the invention will now be described with reference to FIG. 2. A double or triple thread screw 6a is provided near the outer end of the sleeve 6 and the boss 20 of the handle 18 is threaded to the multiple thread screw 6a through a bushing 20a.

The multiple thread screw 6a is cut such that when the handle 18 is rotated in the forward direction shown by an arrow a, i.e. in a direction to take up the string, the handle 18 is moved toward the drag knob 15 (that is toward left as viewed in FIG. 2).

The auxiliary drag mechanism B comprises a compression spring 21a received in an annular recess 21d, a washer 21b urged by the compression spring 21a, an annular ring 21e mounted on the outer end of the sleeve 6 between the washer 21b and the boss 20 of the handle 18 in a manner to be described later, and a torque spring 26 surrounding the annular ring 21e. One end 26a of the torque spring 26 is received in an opening of an annular projection 22 of the annular ring 21e, while the other end 26b is received in an opening 25 of the boss to interconnect the annular ring 21e and the handle 18. Consequently, when the handle boss 20 is moved toward the drag knob 15 by rotating the handle 18 against the force of the torque spring 26, the drag shaft 10 would be moved toward left.

The torque spring 26 is set such that its twisting torque will be increased when the handle 18 is rotated in the forward direction so as to return the handle to the original position when it is released.

A polygonal portion 24 is formed at the outer end of the sleeve 6 at a portion to the left of the multiple threads 6a and a polygonal opening 23 is provided at the center of the annular ring 21e to receive the polygonal portion 24. The opening 23 is provided with projections 27 from annular ring 21e of the number equal to the number of the corners 24a (in this case, 4) of the polygonal portion 24 or the least common multiple of the number of the corners so that the annular ring 21e and the polygonal portion 24 can move relatively in the axial direction and rotate by a limited angle α with respect to each other. This relationship is best understood by referring to FIG. 3. Consequently, when the handle 18 is rotated by angle α in the forward direction A the torque spring 26 will store a twisting torque which is used to return the handle to the original position. Furthermore, it is preset such that when the annular ring 21e is rotated by angle α, the pressure applied to the drag knob 15 would become a maximum.

Thus, with the auxiliary drag mechanism B, when the handle is released after the automatic kick, the torque spring 26 returns the handle to the original position, thus resuming the open drag state. In other words, once the handle is rotated in the forward direction, it is not necessary to manually rotate it in the opposite direction.

Where the multiple threads 6a comprise triple threads, rotation of the handle 18 through an angle of 120° produces a torque corresponding to that produced by one pitch of a single screw thread, that is when the handle is rotated 360°. In other words, it is possible to produce sufficiently large torque with a small angle of rotation of the handle. Moreover, use of a multiple thread screw reduces play of the handle.

When the sleeve 6 and the handle boss 20 are coupled together through single thread screw, although the torque can be increased by increasing the pitch of the screw threads, such construction causes a play of the handle.

With the construction described above, as it is possible to operate the main drag mechanism A by the drag knob 15 independently of the auxiliary drag mechanism B, when the handle 18 is rotated in the forward direction as shown by arrow a, i.e. in a direction to take up the fishing string, the boss 20 is moved toward the drag knob so as to compress springs 21a and 26. This compressive force acts upon the drag knob 15 so that the drag shaft 10 is moved toward the left with respect to the bushing 20a which means an increase in the drag force.

Rotation of the handle is transmitted to the rotor 2 for rotating the same via sleeve 6, the main drag mechanism A, the master gear 7, the pinion 4 and the hollow shaft 3.

Consequently, when a bail arm, not shown, is rotated to a state for taking up the string from a state for paying out the string, i.e. an open drag condition, it is possible to effect the automatic kick by merely rotating the handle in the forward direction without relying upon any drag operation.

FIG. 4 shows a modification in which a plurality of circumferentially spaced apart openings 25a, 25b and 25c are provided on the lefthand surface of the boss 20 to selectively receive one end 26b of the torque spring 26 for the purpose of adjusting the initial torque of the torque spring 26.

As above described irrespective of the strength of the drag force, it is possible to apply an adequate torque to the master gear 7 by forward or reverse rotation of the handle 18 so that in an open drag state or in a case wherein the drag force is made minimum it is possible to apply a kick force to the rotor 2 which is necessary to reverse the bail arm, by merely rotating the handle 18 in the forward direction without operating the drag knob thus improving the performance and operation of the spinning reel. Moreover, as the handle boss 20 is coupled to the sleeve 6 through multiple thread screw it is possible not only to produce a large torque with a small angle of rotation of the handle put also to prevent play thereof. Use of a torque spring for the auxiliary drag mechanism, permits the rotated handle to automatically return to the original position when it is released, thus eliminating a manual resetting operation of the handle. Furthermore, as the annular member 21e of the auxiliary drag mechanism B is coupled to the sleeve 7 through a polygonal opening and a polygonal portion received therein it is possible to apply a maximum pressure to the drag knob with a small angle of rotation of the handle.

Although the fishing spinning reel is incorporated with the auxiliary drag mechanism, it is possible to operate the main drag mechanism independently of the auxiliary drag mechanism. The auxiliary drag mechanism of this invention has a rigid and simple construction and can readily be incorporated into a conventional fishing spinning reel by a slight modification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a fishing spinning reel comprising in combination a rotor, a handle, a main drag mechanism and a drag shaft, a boss of the handle connected through threads of a screw to a sleeve which supports the main drag mechanism, the drag shaft extending through the sleeve, and a drag knob connected to one end of said drag shaft, the improvement which comprises an auxiliary drag mechanism interposed between said drag knob and said handle boss, said auxiliary drag mechanism comprising an annular ring interposed between said drag knob and and said handle boss and a torque spring interposed between said annular ring and said handle boss so that when said handle is rotated about said sleeve said annular ring is moved in the direction of said drag knob and said torque spring is compressed to increase its twisting torque so as to return said handle to its original position upon release.

2. The fishing spinning reel according to claim 1 wherein said screw comprises a multiple thread screw.

3. The fishing spinning reel according to claim 1 wherein said sleeve has a polygonal portion having a number of corners adjacent said screw threads and said annular ring is provided with a polygonal opening for receiving said polygonal portion, said polygonal opening having a plurality of radial projections from said annular ring of a number equal to the least common multiple of said number of corners.

4. The fishing spinning reel according to claim 1 wherein said auxiliary drag mechanism further comprises a compression spring received in a recess of said drag knob and a washer interposed between said compression spring and said annular ring.

5. The fishing spinning reel according to claim 1 wherein one end of said torque spring is connected to said annular ring and the other end of said torque spring is received in an opening of said handle boss.

6. The fishing spinning reel according to claim 5 wherein said handle boss is provided with a plurality of circumferentially spaced apart openings for selectively receiving said other end of said torque spring.

7. The fishing spinning reel according to claim 3 wherein the number of radial projections from said annular ring equals the number of corners of said polygonal portion.

* * * * *